United States Patent
Chuang et al.

(10) Patent No.: US 10,388,031 B2
(45) Date of Patent: Aug. 20, 2019

(54) METHOD AND SYSTEM FOR ESTIMATING EPIPOLAR GEOMETRY

(71) Applicant: National Chiao Tung University, Hsinchu (TW)

(72) Inventors: Jen-Hui Chuang, Hsinchu (TW); Yong-Sheng Chen, Taipei (TW); Mu-Tien Lu, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 15/598,792

(22) Filed: May 18, 2017

(65) Prior Publication Data

US 2018/0061082 A1   Mar. 1, 2018

(30) Foreign Application Priority Data

Aug. 31, 2016   (TW) .............................. 105127994 A

(51) Int. Cl.
 *G06T 7/80* (2017.01)
 *H04N 13/246* (2018.01)
 *H04N 13/239* (2018.01)

(52) U.S. Cl.
 CPC ............. *G06T 7/85* (2017.01); *H04N 13/239* (2018.05); *H04N 13/246* (2018.05); *G06T 2207/30208* (2013.01)

(58) Field of Classification Search
 CPC .................................. G06T 7/85; H04N 13/246
 See application file for complete search history.

(56) References Cited

U.S. PATENT DOCUMENTS

| | | | |
|---|---|---|---|
| 5,432,712 A * | 7/1995 | Chan ...................... | G01C 11/06 382/191 |
| 6,771,810 B1 | 8/2004 | Zhang | |
| 6,993,179 B1 * | 1/2006 | Weinshall ............ | H04N 13/239 382/154 |
| 8,077,965 B2 | 12/2011 | Kakinami | |
| 9,183,634 B2 | 11/2015 | Tsuzuki | |

(Continued)

OTHER PUBLICATIONS

Dao, Vinh Ninh "A Dynamic Geometry Reconstruction Technique for Mobile Devices Using Adaptive Checkerboard Recognition and Epipolar Geometry" IEICE Trans. Inf. & Sys., vol. E94-D, No. 2, Feb. 2011 (Year: 2011).*

(Continued)

*Primary Examiner* — Jamie J Atala
*Assistant Examiner* — Michael Robert Cammarata
(74) *Attorney, Agent, or Firm* — Pepper Hamilton LLP

(57) ABSTRACT

A method for estimating epipolar geometry and to be performed by a processing module includes the steps of: A) choosing, in each first and third images captured by a first image capturing module, two points which are collinear with a corresponding one of a first reference object in the first image and a second reference object in the third image, such that in each second and fourth images captured by a second image capturing module, two points corresponding to the two points chosen in a respective one of the first and third images are collinear with a corresponding one of the first reference object in the second image and the second reference object in the fourth image; and B) determining first and second epipoles based on the aforementioned points.

14 Claims, 8 Drawing Sheets

(56) References Cited

U.S. PATENT DOCUMENTS

| | | | | |
|---|---|---|---|---|
| 9,503,703 | B1* | 11/2016 | Ramaswamy | H04N 13/246 13/246 |
| 2002/0024593 | A1* | 2/2002 | Bouguet | G01B 11/2504 348/46 |
| 2004/0184010 | A1* | 9/2004 | Raskar | G03B 37/04 353/94 |
| 2004/0184011 | A1* | 9/2004 | Raskar | G03B 21/26 353/94 |
| 2006/0227999 | A1* | 10/2006 | Taylor | G06K 9/00979 382/103 |
| 2015/0104097 | A1* | 4/2015 | Tsuzuki | G06T 7/85 382/154 |
| 2017/0054965 | A1* | 2/2017 | Raab | G01C 11/02 |
| 2017/0211927 | A1* | 7/2017 | Bridges | H04N 5/2251 |
| 2018/0238681 | A1* | 8/2018 | Tohme | G01B 11/2545 |

OTHER PUBLICATIONS

Study on Epipolar Geometry Restoration of Parallel Binocular Vision, Proceedings of the 2006 IEEE International Conference on Robotics and Biomimetics, Dec. 17, 2006 (Year: 2006).*

Kanade, Takeo, "Factorization Methods for Structure from Motion", Philosophical Transactions: Mathematical, Physical and Engineering Sciences, vol. 356, No. 1740, New Geometric Techniques in Computer Vision (May 15, 1998), pp. 1153-1173 (Year: 1998).*

Shimin Wang et al., "A Linear Solving Method for Rank 2 Fundamental Matrix of Non-compulsory Constraint." Proceedings of the 2009 IEEE International Conference on Robotics and Biomimetics, Dec. 19-23, 2009, Guilin, China, pp. 2102-2107.

Jiangbin Zheng and Wenbo Shi, "An Improved Algorithm of Fundamental Matrix Estimation based on Epipolar Line Restriction." 2008 9th International Conference on Signal Processing (ICSP 2008), IEEE, 2008, pp. 1350-1354.

Farhoosh Alghabi and Mohsen Soryani, "Direct Computation of Epipoles Using Two Pairs of Point-Line Correspondences." Second International Symposium on Intelligent Information Technology Application. IITA'08. vol. 3. IEEE, 2008, pp. 486-489.

Tsuyoshi Migita and Takeshi Shakunaga, "Evaluation of Epipole Estimation Methods with/without Rank-2 Constraint across Algebraic/Geometric Error Functions." 2007 IEEE Conference on Computer Vision and Pattern Recognition, CVPR'07, IEEE, 2007, 7 pages.

Tomu Tahara et al., "Interference-free Epipole-centered Structured Light Pattern for Mirror-based Multi-view Active Stereo." 2015 International Conference on 3D Vision, IEEE, 2015, pp. 153-161.

Lingfeng Xu et al., "Image Rectification for Single Camera Stereo System." 2011 18th IEEE International Conference on Image Processing, IEEE, 2011, pp. 977-980.

* cited by examiner

Determining two points in a second image based on two points chosen in a first image to be used as input data to a predetermined lookup table — 721'

METHOD AND SYSTEM FOR ESTIMATING EPIPOLAR GEOMETRY

CROSS-REFERENCE TO RELATED APPLICATION

This application claims priority of Taiwanese Patent Application No. 105127994, filed on Aug. 31, 2016.

FIELD

The disclosure relates to a method and a system associated with computer vision, and more particularly to a method and a system for estimating epipolar geometry.

BACKGROUND

A conventional method for estimating epipolar geometry associated with a first camera and a second camera has been disclosed by Z. Zhang, "Determining the epipolar geometry and its uncertainty—a review", International Journal of Computer Vision, vol. 27: 161-198 (1998). In the conventional method, a processor obtains a first image and a second image each of which is an image of at least seven reference objects that are coplanar with each other, and each of which is captured by a respective one of the first camera and the second camera. The processor then determines respective coordinates of said at least seven reference objects in the first image, and another respective coordinates of said at least seven reference objects in the second image. By utilizing the aforementioned respective coordinates of said at least seven reference objects in the first and second images, a fundamental matrix is estimated, so coordinates of a first epipole that is associated with the first camera and a second epipole that is associated with the second camera are able to be further determined based on the fundamental matrix.

However, it should be noted that several kinds of errors exist in reality; for example, inaccurate measurement of the respective coordinates of the reference objects in the first and second images may lead to inaccurate estimation of the fundamental matrix. Additionally, to promote accuracy of the estimation of the fundamental matrix, tens or hundreds of reference objects may be utilized, and a corresponding number of respective coordinates of the reference objects in the first and second images are required to be determined for estimating the fundamental matrix, thereby increasing an amount of computation.

SUMMARY

Therefore, an object of the disclosure is to provide a method and a system for estimating epipolar geometry that can alleviate at least one of the drawbacks of the prior art.

According to an aspect of the disclosure, the method is for estimating epipolar geometry associated with a first image capturing module and a second image capturing module, and is to be performed by a processing module. The method includes the steps of:

a) obtaining a first image and a second image each of which is an image of a calibration board and a first reference object that is non-coplanar with the calibration board, and each of which is captured by a respective one of the first image capturing module and the second image capturing module;

b) choosing, in the first image, two points which are distinct from each other, which are contained in the calibration board in the first image and which are collinear with the first reference object in the first image;

c) determining, in the second image, two points which are distinct from each other, which are contained in the calibration board in the second image, and which correspond respectively to the two points chosen in the first image in step b);

d) making a first determination as to whether the two points determined in the second image in step c) are collinear with the first reference object in the second image, and performing steps b) c) and d) once again when a result of the first determination is negative;

e) when the result of the first determination is affirmative, determining in the first image a first epipolar line which passes through the two points chosen in the first image in step b) and the first reference object in the first image, and determining in the second image, a second epipolar line which passes through the two points determined in the second image in step c) and through the first reference object in the second image;

f) obtaining a third image and a fourth image each of which is an image of the calibration board and a second reference object that is non-coplanar with the calibration board, and each of which is captured by a respective one of the first image capturing module and the second image capturing module;

g) choosing, in the third image, two points which are distinct from each other, which are contained in the calibration board in the third image and which are collinear with the second reference object in the third image;

h) determining, in the fourth image, two points which are distinct from each other and which are contained in the calibration board in the fourth image, and which correspond respectively to the two points chosen in the third image in step g);

i) making a second determination as to whether the two points determined in the fourth image in step h) are collinear with the second reference object in the fourth image, and performing steps g) h) and i) once again when a result of the second determination is negative;

j) when the result of the second determination is affirmative, determining in the third image a third epipolar line which passes through the two points chosen in the third image in step g) and through the second reference object in the third image, and determining in the fourth image, a fourth epipolar line which passes through the two points determined in the fourth image in step h) and through the second reference object in the fourth image; and k) determining, based on the first epipolar line and the third epipolar line, a first epipole of the first image capturing module, and determining, based on the second epipolar line and the fourth epipolar line, a second epipole of the second image capturing module.

According to another aspect of the disclosure, the system for estimating epipolar geometry includes a calibration board, a first reference object, a second reference object, a first image capturing module, a second image capturing module and a processing module. The first reference object is non-coplanar with the calibration board. The second reference object is different from the first reference object and non-coplanar with the calibration board. The first image capturing module is configured to capture a first image which is an image of the calibration board and the first reference object. The second image capturing module is configured to capture a second image which is another image of the calibration board and the first reference object. The processing module is coupled electrically to the first image capturing module and the second image capturing module. The processing module is configured to obtain the first image and the second image. The processing module is configured to choose, in the first image, two points which are distinct from each other, which are contained in the calibration board in the first image and which are collinear with the first reference object in the first image. The processing module is configured to determine, in the second image, two points which are distinct from each other, which are contained in the calibration board in the second image, and which correspond respectively to the two points chosen in the first image. The processing module is configured to make a first determination as to whether the two points determined in the second image are collinear with the first reference object in the second image. When a result of the first determination is negative, the processing module is configured to perform once again steps of choosing two points in the first image, determining two points in the second image, and making the first determination. When the result of the first determination is affirmative, the processing module is configured to determine in the first image, a first epipolar line which passes through the two points chosen in the first image and the first reference object in the first image, and to determine in the second image, a second epipolar line which passes through the two points determined in the second image and the first reference object in the second image. The processing module is configured to obtain a third image and a fourth image each of which is an image of the calibration board and the second reference object, and each of which is captured by a respective one of the first image capturing module and the second image capturing module. The processing module is configured to choose, in the third image, two points which are distinct from each other, which are contained in the calibration board in the third image and which are collinear with the second reference object in the third image. The processing module is configured to determine, in the fourth image, two points which are distinct from each other and which are contained in the calibration board in the fourth image, and which correspond respectively to the two points chosen in the third image. The processing module is configured to make a second determination as to whether the two points determined in the fourth image are collinear with the second reference object in the fourth image. When a result of the second determination is negative, the processing module is configured to perform once again steps of choosing two points in the third image, determining two points in the fourth image, and making the second determination. When the result of the second determination is affirmative, the processing module is configured to determine in the third image, a third epipolar line which passes through the two points chosen in the third image and the second reference object in the third image, and to determine in the fourth image, a fourth epipolar line which passes through the two points determined in the fourth image and the second reference object in the fourth image. The processing module is configured to determine, based on the first epipolar line and the third epipolar line, a first epipole of the first image capturing module, and to determine, based on the second epipolar line and the fourth epipolar line, a second epipole of the second image capturing module.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
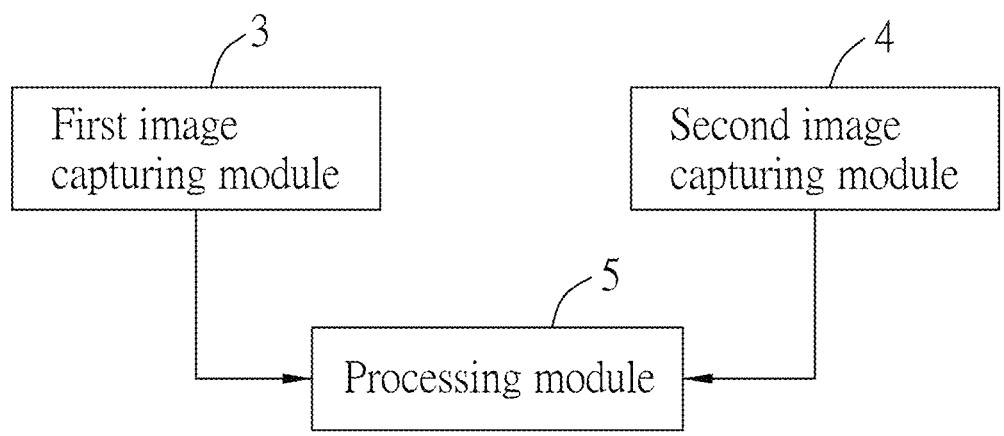
FIG. 1 is a block diagram illustrating a first embodiment of a system for estimating epipolar geometry according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
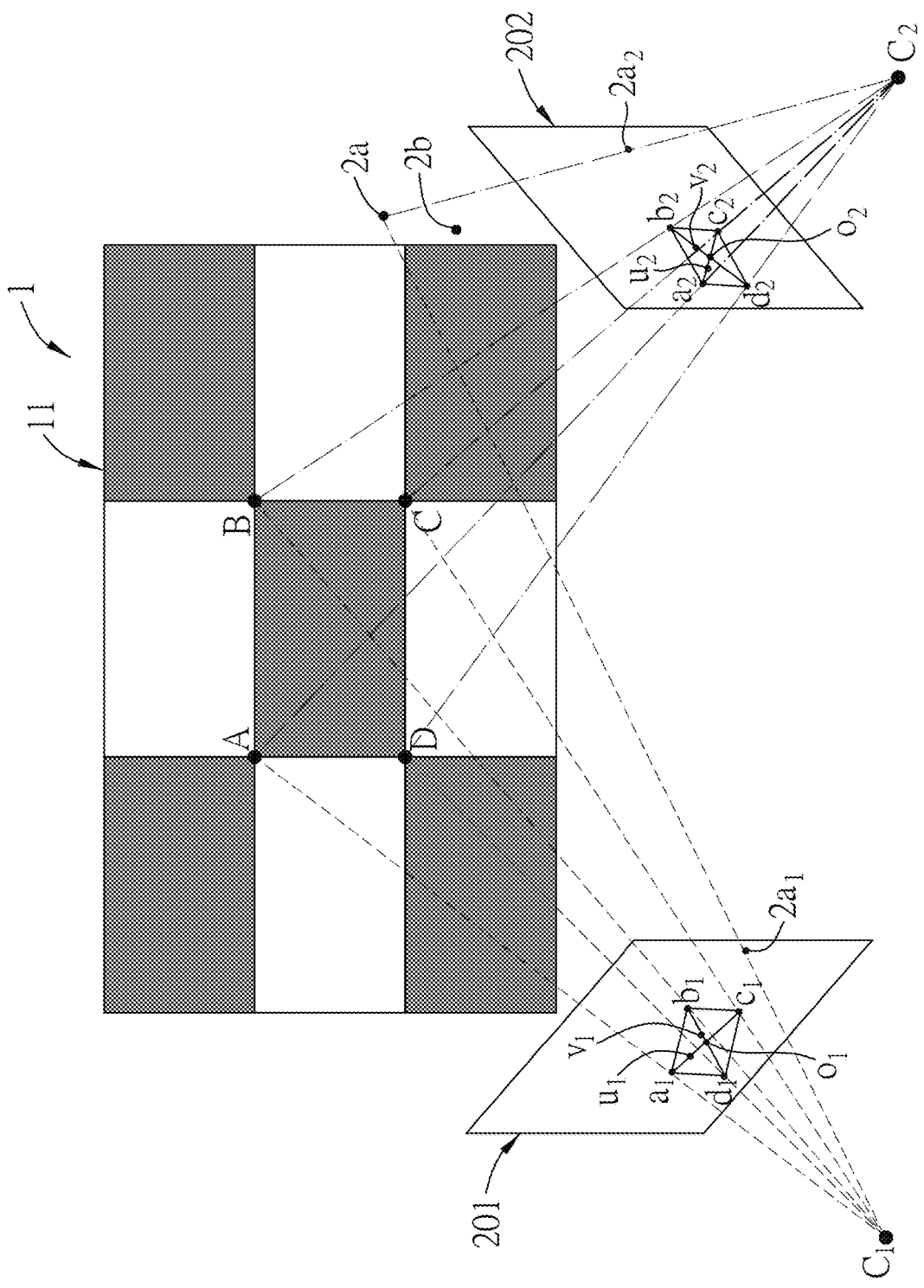
FIG. 2 is a schematic diagram illustrating first embodiments of a first image and a second image which are captured respectively by first and second image capturing modules and which are images of a calibration board and a first reference object.

Referring to FIGS. 1 and 2, a first embodiment of a system for estimating epipolar geometry is illustrated. The system includes a calibration board 1, a first reference object (2a), a second reference object (2b) a first image capturing module 3, a second image capturing module 4, and a processing module 5 that is coupled electrically to the first image capturing module 3 and the second image capturing module 4. In this embodiment, each of the first and second image capturing modules 3 and 4 may be exemplified by a camera or any other image capturing device with a camera aperture and an image sensor, and the processing module 5 may be exemplified by a processor, a central processing unit (CPU), a digital signal processor (DSP), a system on a chip (SoC) or any other device having computation capability.

The calibration board 1 is provided with a figure of a parallelogram (ABCD) that has a first diagonal and a second diagonal. The calibration board 1 may be implemented by a checkerboard 11 consisting of nine parallelograms of alternating dark and light color as shown in FIG. 2.

The first reference object (2a) and the second reference object (2b) are both non-coplanar with the calibration board 1 and are disposed at different positions. In the first embodiment, each of the first reference object (2a) and the second reference object (2b) is a substantially spherical object.

The first image capturing module 3 and the second image capturing module 4 are spaced apart from each other. Referring to FIG. 2, the first image capturing module 3 has a first focus $C_1$, and the second image capturing module 4 has a second focus $C_2$. The first image capturing module 3 is configured to capture a first image 201 which is an image of the calibration board 1 and the first reference object (2a), and to capture a third image (not shown) which is an image of the calibration board 1 and the second reference object (2b). The second image capturing module 4 is configured to capture a second image 202 which is another image of the calibration board 1 and the first reference object (2a), and to capture a fourth image (not shown) which is another image of the calibration board 1 and the second reference object (2b). Each of the first image 201, the second image 202, the third image and the fourth image contains the figure of the parallelogram (ABCD) therein.

It is worth to note that in the first embodiment, the first reference object (2a) and the second reference object (2b) do not simultaneously appear for being captured by the first image capturing module 3 and the second image capturing module 4. In other words, the first image 201 and the second image 202 do not include the second reference object (2b), and the third image and the fourth image do not include the first reference object (2a). However, implementation may vary in other embodiments. For example, the first reference object (2a) and the second reference object (2b) may appear simultaneously for being captured by the first image capturing module 3 and the second image capturing module 4. In this implementation, the first image capturing module 3 captures only the first image 201, the second image capturing module 4 captures only the second image 202, and the third and fourth images are not captured. That is to say, each of the first image 201 and the second image 202 include both the first reference object (2a) and the second reference object (2b). Subsequently, the first and second reference objects (2a, 2b) in each of the first and second images 201, 202 are separately processed.

The processing module 5 is configured to obtain the first image 201, the second image 202, the third image and the fourth image.

The processing module 5 is configured to choose, in the first image 201, two points ($u_1$, $v_1$) which are distinct from each other, which are contained in the calibration board in the first image, which are respectively located on the first diagonal and the second diagonal of the parallelogram in the first image ($a_1b_1c_1d_1$), and which are collinear with the first reference object in the first image ($2a_1$).

The processing module 5 is configured to determine in the second image 202, two points ($u_2$, $v_2$) which are distinct from each other, which are contained in the calibration board in the second image, and which correspond respectively to the two points chosen in the first image ($u_1$, $v_1$). One of the two points ($u_2$) which is located on the first diagonal of the parallelogram in the second image is determined based on a geometric relationship between a position of the point located on the first diagonal of the parallelogram in the first image ($u_1$) and the first diagonal of the parallelogram in the first image, such as a ratio between two parts of the first diagonal of the parallelogram in the first image as divided by the point located on the first diagonal of the parallelogram in the first image ($u_1$). The other one of the two points ($v_2$) which is located on the second diagonal of the parallelogram in the second image is determined based on a geometric relationship between a position of said other point located on the second diagonal of the parallelogram in the first image ($v_1$) and the second diagonal of the parallelogram in the first image, such as a ratio between two parts of the second diagonal of the parallelogram in the first image as divided by said other point located on the second diagonal of the parallelogram in the first image ($v_1$).

Specifically speaking, in the first embodiment, the ratio is a ratio in length between the two parts, and the two points respectively located on the first diagonal and second diagonal of the parallelogram in the second image ($u_2$, $v_2$) are determined based on cross-ratio relationships $$\frac{\overline{a_1o_1} \cdot \overline{u_1c_1}}{\overline{u_1o_1} \cdot \overline{a_1c_1}} = \frac{\overline{a_2o_2} \cdot \overline{u_2c_2}}{\overline{u_2o_2} \cdot \overline{a_2c_2}} \text{ and } \frac{\overline{o_1b_1} \cdot \overline{v_1d_1}}{\overline{o_1v_1} \cdot \overline{d_1b_1}} = \frac{\overline{o_2b_2} \cdot \overline{v_2d_2}}{\overline{o_2v_2} \cdot \overline{d_2b_2}},$$

where $a_1$, $b_1$, $c_1$ and $d_1$ are vertexes of the parallelogram in the first image ($a_1b_1c_1d_1$), $a_2$, $b_2$, $c_2$ and $d_2$ are vertexes of the parallelogram in the second image ($a_2b_2c_2d_2$) $o_1$ is a point of intersection of the first diagonal and second diagonal of the parallelogram in the first image, and $o_2$ is a point of intersection of the first diagonal and second diagonal of the parallelogram in the second image.

The processing module 5 is configured to make a first determination as to whether the two points determined in the second image ($u_2$, $v_2$) are collinear with the first reference object in the second image ($2a_2$), and, when a result of the first determination is negative, to perform once again the aforementioned steps of choosing two points in the first image (not shown), determining two points in the second image (not shown), and making the first determination. The processing module 5 is configured to, when the result of the first determination is affirmative, determine in the first image 201 a first epipolar line which passes through the two points chosen in the first image ($u_1$, $v_1$) and the first reference object in the first image ($2a_1$), and determine in the second image 202 a second epipolar line which passes through the two points determined in the second image ($u_2$, $v_2$) and the first reference object in the second image ($2a_2$).

Similarly, the processing module 5 is configured to choose, in the third image (not shown), two points which are distinct from each other, which are contained in the calibration board in the third image, which are respectively located on the first diagonal and the second diagonal of the parallelogram in the third image, and which are collinear with the second reference object in the third image.

The processing module 5 is configured to determine, in the fourth image (not shown), two points which are distinct from each other, which are contained in the calibration board in the fourth image, and which correspond respectively to the two points chosen in the third image.

One of the two points which is located on the first diagonal of the parallelogram in the fourth image is determined based on a geometric relationship between a position of the point located on the first diagonal of the parallelogram in the third image and the first diagonal of the parallelogram in the third image, such as a ratio between two parts of the first diagonal of the parallelogram in the third image as divided by the point located on the first diagonal of the parallelogram in the third image. The other one of the two points which is located on the second diagonal of the parallelogram in the fourth image is determined based on a geometric relationship between a position of said other point located on the second diagonal of the parallelogram in the third image and the second diagonal of the parallelogram in the third image, such as a ratio between two parts of the second diagonal of the parallelogram in the third image as divided by said other point located on the second diagonal of the parallelogram in the third image.

Like what has been mentioned previously, in the first embodiment, the two points respectively located on the first diagonal and second diagonal of the parallelogram in the fourth image are determined based on cross-ratio relationships. Since the approach of determination by cross-ratio relationships has been addressed, details thereof are omitted herein.

The processing module 5 is configured to make a second determination as to whether the two points determined in the fourth image are collinear with the second reference object in the fourth image. The processing module 5 is configured to, when a result of the second determination is negative, perform once again the aforementioned steps of choosing two points in the third image, determining two points in the fourth image, and making the second determination. The processing module 5 is configured to, when the result of the second determination is affirmative, determine in the third image a third epipolar line which passes through the two points chosen in the third image and the second reference object in the third image, and determine in the fourth image a fourth epipolar line which passes through the two points determined in the fourth image and the second reference object in the fourth image.

The processing module 5 is configured to determine, based on the first epipolar line and the third epipolar line, a first epipole of the first image capturing module 3, and to determine, based on the second epipolar line and the fourth epipolar line, a second epipole of the second image capturing module 4.

The processing module 5 is configured to obtain a first set of corresponding points that includes one of the two points chosen in the first image ($u_1$) and the corresponding one of the two points determined in the second image ($u_2$), a second set of corresponding points that includes the other one of the two points chosen in the first image ($v_1$) and the corresponding one of the two points determined in the second image ($v_2$), a third set of corresponding points that includes one of the two points chosen in the third image and the corresponding one of the two points determined in the fourth image, and a fourth set of corresponding points that includes the other one of the two points chosen in the third image and the corresponding one of the two points determined in the fourth image. The processing module 5 is further configured to establish a fundamental matrix for the epipolar geometry associated with the first image capturing module 3 and the second image capturing module 4 according to the first epipole and the second epipole thus determined, and according to at least three of the first set of corresponding points, the second set of corresponding points, the third set of corresponding points and the fourth set of corresponding points. Given that $(x_e, y_e, 1)^T$ is a coordinate of the first epipole and that $(x_{e'}, y_{e'}, 1)^T$ is a coordinate of the second epipole, the fundamental matrix $$F = \begin{bmatrix} 1 & b & -x_e - by_e \\ c & d & -cx_e - dy_e \\ -x_{e'} - by_{e'} & -cx_{e'} - dy_{e'} & (x_e + by_e)x_{e'} + (cx_e + dy_e)y_{e'} \end{bmatrix}$$

can be established by solving an equation $x_i'^T F x_i = 0$ for $i=1$ to 3, where b, c and d are unknowns to be solved, $(x_1, x_1')$, $(x_2, x_2')$ and $(x_3, x_3')$ respectively represent said at least three of the first set of corresponding points, the second set of corresponding points, the third set of corresponding points and the fourth set of corresponding points.

Figure 3:
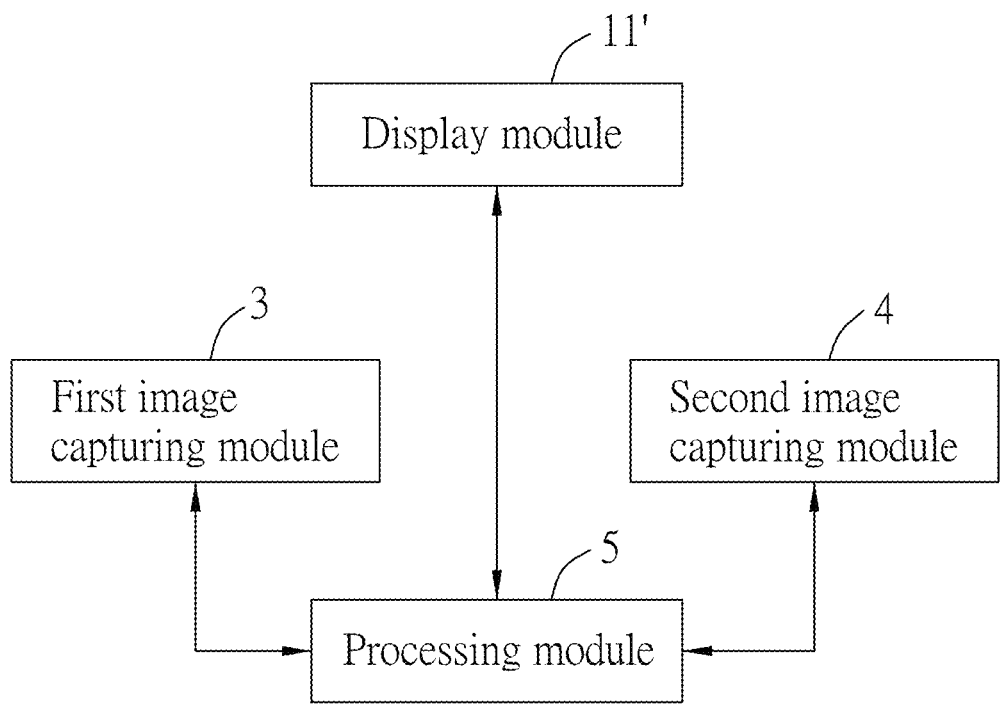
FIG. 3 is a block diagram illustrating a second embodiment of the system for estimating epipolar geometry according to the disclosure which further includes a display module.
Figure 4:
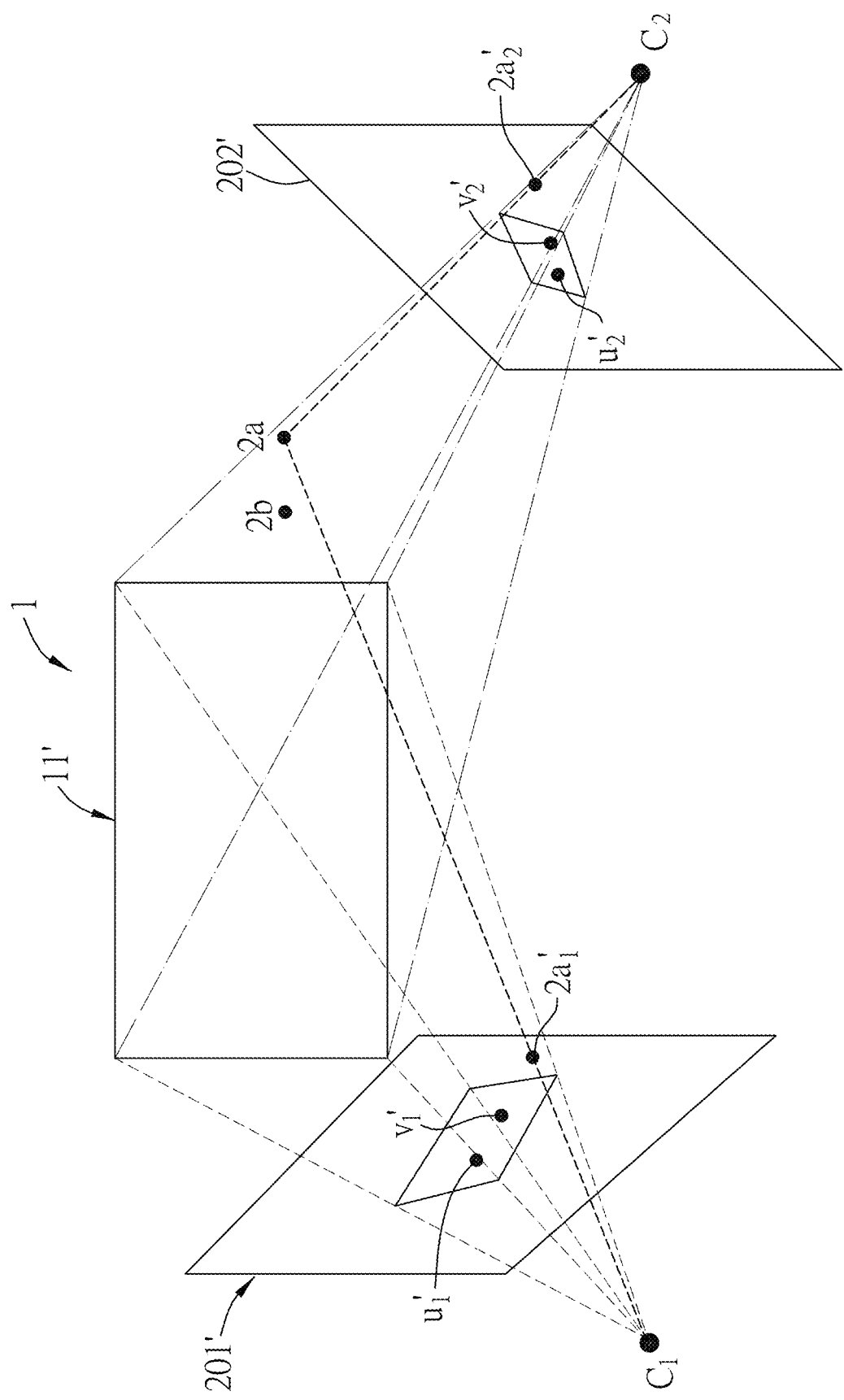
FIG. 4 is a schematic diagram illustrating second embodiments of the first image and the second image which are captured respectively by the first and second image capturing modules and which are images of the display module and the first reference object.

Referring to FIGS. 3 and 4, a second embodiment of the system for estimating epipolar geometry is illustrated. The second embodiment is similar to the first embodiment, but is different in the approach to choose the two points in the first image/the third image and the approach to determine the two points in the second image/the fourth image, as will be described in the following.

A display module 11' is utilized to serve as the calibration board 1 and is controlled by the processing module 5 to display light points. In this embodiment, the display module 1 may be exemplified by a liquid-crystal display (LCD) screen, a television, a computer monitor or any other output device for presentation of information in visual form. The processing module 5 is further configured to obtain a predetermined lookup table which is associated with positions of the first image capturing module 3 and the second image capturing module 4 relative to each other, and which stores correspondence relationships between points contained in the calibration board in the first image and points contained in the calibration board in the second image. The predetermined lookup table is established in advance by steps of: displaying one by one, using the display module 11', a plurality of light points, each at a different position on the display module 11'; for each of the light points displayed on the display module 11' capturing, using the first image capturing module 3 and the second image capturing module 4, images of the display module 11', where the light point included in the image captured by the first image capturing module 3 corresponds to the light point included in the image captured by the second image capturing module 4; and establishing the lookup table according to each correspondence between the light point included in the image captured by the first image capturing module 3 and the light point included in the image captured by the second image capturing module 4.

It is worth noting that implementation of the predetermined lookup table may vary in other embodiments. For example, the predetermined lookup table may be implemented by displaying one by one, using the display module 11', a plurality of light points, each at a different position on either one of two distinct lines on the display module 11', and storing merely correspondence relationships between the light points on the two distinct lines contained in the display module in the first image 201' and the light points on the two distinct lines contained in the display module in the second image 202', so that search space required for the table lookup is reduced and efficiency is thereby increased.

In a condition that relative positions of the first and second image capturing modules 3, 4, the first and second reference objects (2a, 2b), and the display module 11' are kept invariant, the processing module 5 is capable of determining in the second image 202' based on the predetermined lookup table and two points chosen in the first image ($u_1'$, $v_1'$) to be used as input data to the predetermined lookup table, two points contained in the calibration board in the second image ($u_2'$, $v_2'$), and is capable of determining in the fourth image (not shown), based on the same predetermined lookup table and two points chosen in the third image (not shown) to be used as input data to the predetermined lookup table, two points contained in the calibration board in the fourth image.

Specifically speaking, referring to FIGS. 3 and 4, in the second embodiment, the processing module 5 is configured to, after the predetermined lookup table has been established, choose in the first image 201', two points ($u_1'$, $v_1'$) which are distinct from each other and which are collinear with the first reference object in the first image ($2a_1'$). The processing module 5 then determines in the second image 202', based on the predetermined lookup table and the two points chosen in the first image ($u_1'$, $v_1'$) to be used as input data to the predetermined lookup table, two points contained in the display module in the second image ($u_2'$, $v_2'$). Similarly, the processing module 5 is further configured to choose, in the third image, two points which are distinct from each other and which are collinear with the second reference object in the third image. The processing module 5 then determines in the fourth image, based on the predetermined lookup table and the two points chosen in the third image to be used as input data to the predetermined lookup table, two points contained in the calibration board in the fourth image.

Figure 5:
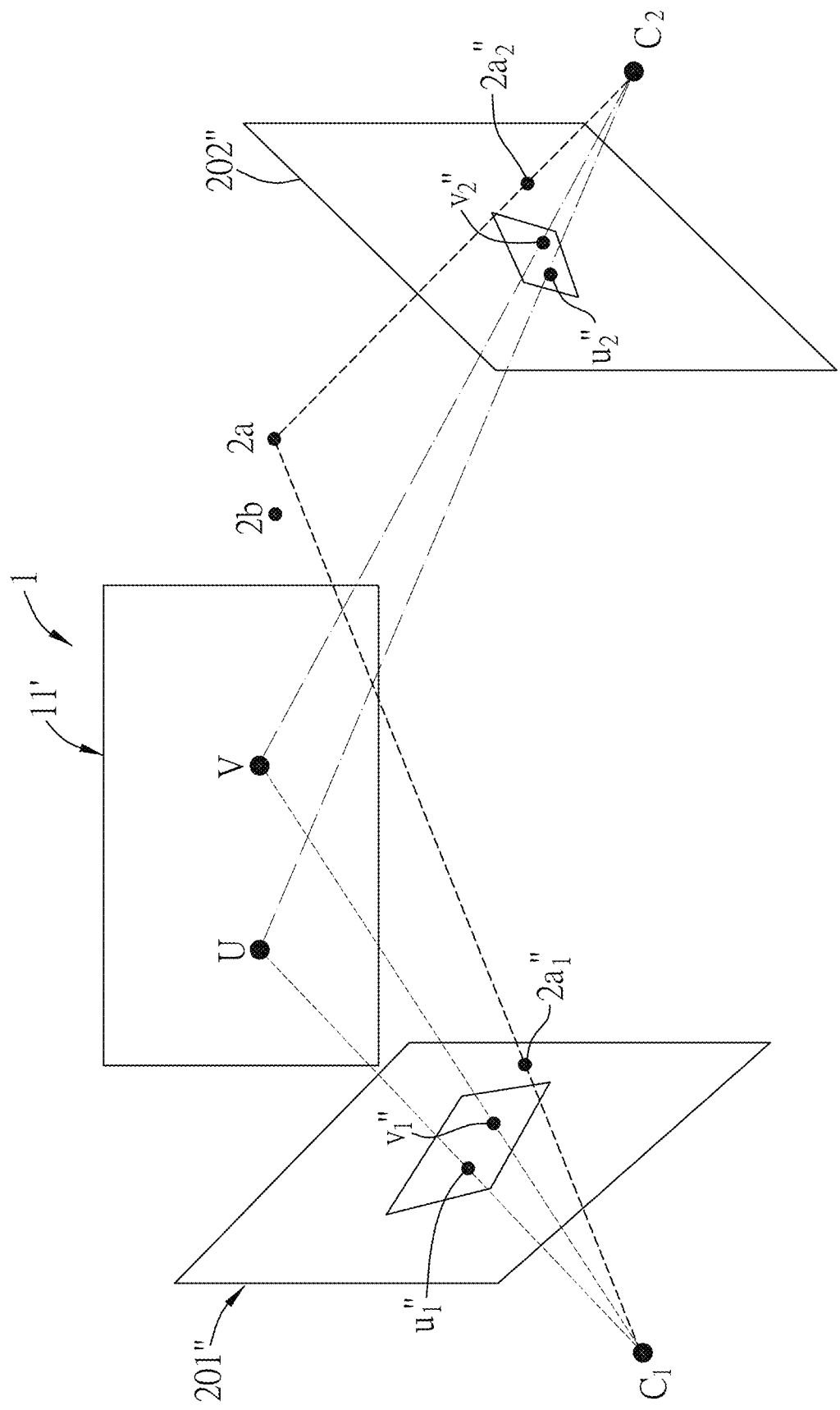
FIG. 5 is a schematic diagram illustrating third embodiments of the first image and the second image which are captured respectively by the first and second image capturing modules and which are images of the first reference object and two light points displayed by the display module.

Referring to FIGS. 3 and 5, a third embodiment of the system for estimating epipolar geometry is illustrated. The third embodiment is similar to the first embodiment, but is different in the approach to choose the two points in the first image/the third image and the approach to determine the two points in the second image/the fourth image, as will become apparent below.

The display module 11' serves as the calibration board 1. The display module 11' is controlled by the processing module 5 to display two distinct light points (U, V) in such a manner that the first image 201" captured by the first image capturing module 3 includes the two light points ($u_1''$, $v_1''$) which are collinear with the first reference object in the first image ($2a_1''$).

In practice, the display module 11' may be controlled to display one of the two light points (U), and said one of the two light points in the first image ($u_1''$) captured by the first image capturing module 3 and the first reference object in the first image ($2a_1''$) may form a line. The processing module 5 may then control the display module 11' to display another one of the two light points (V) along a scanning line, and determine whether said another one of the two light points in the first image ($v_1''$) falls on the line formed by said one of the light points in the first image ($u_1''$) and the first reference point in the first image ($2a_1''$). By repeating the aforesaid steps, the processing module 5 is able to find the exact two light points (U, V) to be displayed on the display module 11' for allowing the two light points in the first image ($u_1''$, $v_1''$) to be collinear with the first reference point in the first image ($2a_1''$).

The processing module 5 is configured to obtain the first image 201" and the second image 202" each of which is an image of the display module 11' and the first reference object ($2a$), and each of which includes the two light points ($u_1''$, $v_1''$) or ($u_2''$, $v_2''$) contained in the display module in the corresponding image.

The processing module 5 is configured to designate, in the first image 201", the two light points contained in the display module in the first image ($u_1''$, $v_1''$) as the two points chosen in the first image 201" which are collinear with the first reference object in the first image ($2a_1''$), and to designate, in the second image 202", the two light points contained in the display module in the second image ($u_2''$, $v_2''$) as the two points determined in the second image 202" which correspond respectively to the two points chosen in the first image ($u_1''$, $v_1''$).

The processing module 5 is configured to, when a result of the first determination as to whether the two points determined in the second image ($u_2''$, $v_2''$) are collinear with the first reference object: in the second image ($2a_2''$) is negative, perform once again the aforementioned steps of controlling the display module 11' to display two light points, designating the two light points in the first image as the two points chosen in the first image, designating the two light points in the second image as the two points determined in the second image, and making the first determination.

Similarly, for the second reference object ($2b$), the display module 11' is controlled by the processing module 5 to display two other light points in such a manner that the third image (not shown) captured by the first image capturing module 3 includes the two other light points which are collinear with the second reference object in the third image. The processing module 5 is configured to obtain the third image (not shown) and the fourth image (not shown) each of which is the image of the display module and the second reference object, and each of which includes the two other light points contained in the display module in the corresponding image.

The processing module 5 is configured to designate, in the third image, the two other light points contained in the display module in the third image as the two points chosen in the third image which are collinear with the second reference object in the third image.

The processing module 5 is configured to designate, in the fourth image, the two other light points contained in the display module in the fourth image as the two points determined in the fourth image which correspond respectively to the two points chosen in the third image.

The processing module 5 is configured to, when a result of the second determination as to whether the two points determined in the fourth image are collinear with the second reference object in the fourth image is negative, perform once again the aforementioned steps of controlling the display module 11' to display still two other light points, designating the still two other light points in the third image as the two points chosen in the third image, designating the still two other light points in the fourth image as the two points determined in the fourth image, and making the second determination.

The third embodiment features convenience of changing positions of the two light points (U, V) displayed on the display module 11' when the result of the first determination or the second determination is negative.

Compared with conventional approaches of estimating epipolar geometry by at least seven reference objects that are coplanar with each other to establish the fundamental matrix and to obtain the first and second epipoles, the aforementioned three embodiments of this disclosure reduce computational complexity in establishing the fundamental matrix, and require only six points provided by the figure of the parallelogram (ABCD) (in the case of the first embodiment) and the first and second reference objects ($2a$, $2b$) to obtain with higher accuracy the first and second epipoles and the fundamental matrix, thereby alleviating several kinds of errors, such as computational errors and measurement errors.

Figure 6:
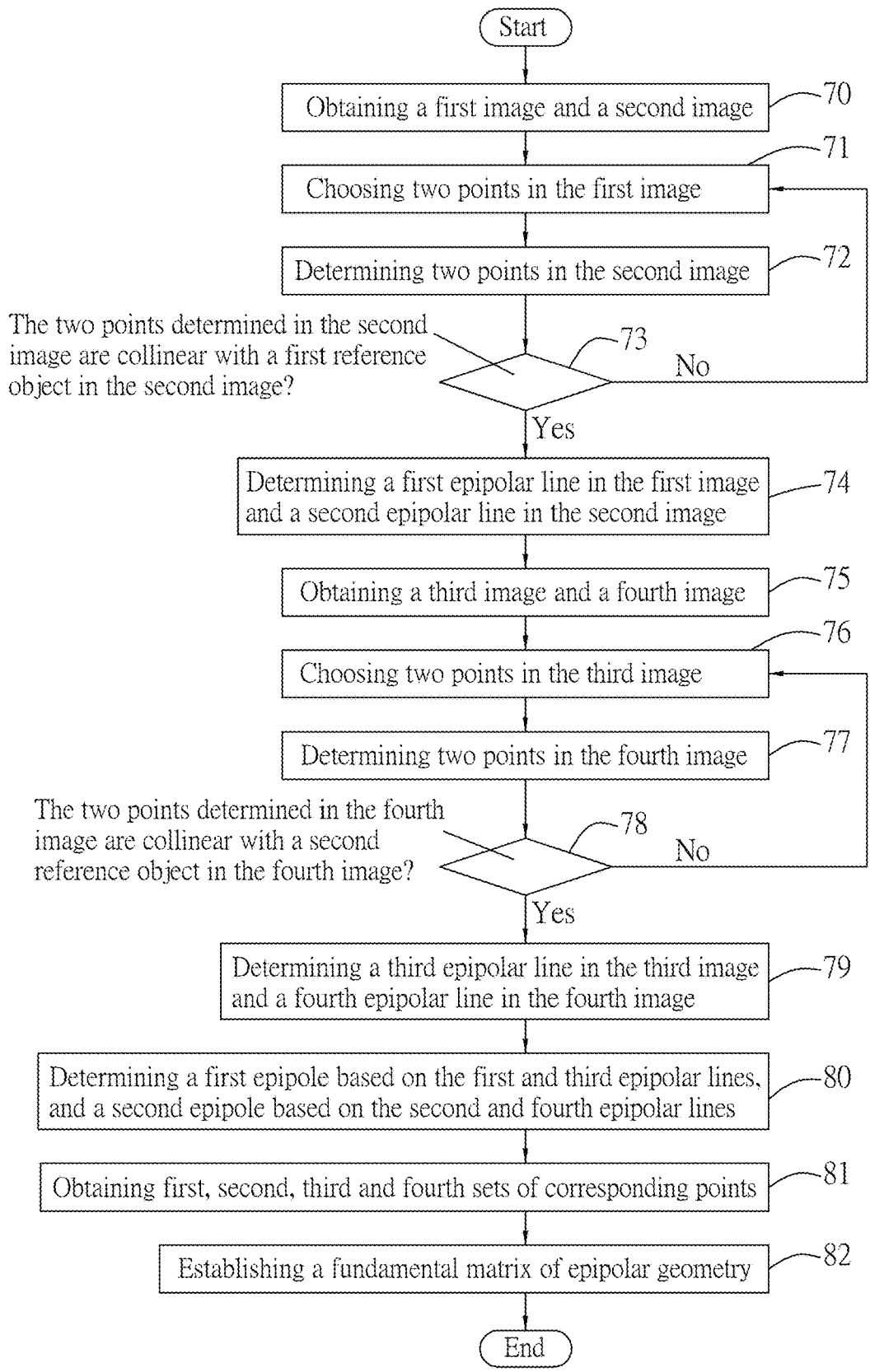
FIG. 6 is a flow chart illustrating an embodiment of a method for estimating epipolar geometry according to the disclosure.

Referring to FIGS. 1, 2 and 6, a method for estimating epipolar geometry associated with the first image capturing module 3 and the second image capturing module 4 is illustrated. The method is to be performed by the processing module 5 of the aforementioned system for estimating epipolar geometry, and includes the following steps 70-82.

In step 70, the processing module 5 obtains a first image 201 and a second image 202 each of which is an image of a calibration board 1 and a first reference object ($2a$) that is non-coplanar with the calibration board 1, and each of which is captured by a respective one of the first image capturing module 3 and the second image capturing module 4.

In step 71, the processing module 5 chooses in the first image 201, two points (e.g., $u_1$, $v_1$ in FIG. 2) which are distinct from each other, which are contained in the calibration board in the first image and which are collinear with the first reference object in the first image (e.g., $2a_1$).

In step 72, the processing module 5 determines, in the second image 202, two points (e.g., $u_2$, $v_2$) which are distinct from each other, which are contained in the calibration board in the second image, and which correspond respectively to the two points chosen in the first image (e.g., $u_1$, $v_1$) in step 71.

In step 73, the processing module 5 makes a first determination as to whether the two points determined in the second image (e.g., $u_2$, $v_2$) in step 72 are collinear with the first reference object in the second image (e.g., $2a_2$), and performing steps 71, 72 and 73 once again when a result of the first determination is negative. When the result of the first determination is affirmative, the processing module 5 performs step 74 to determine in the first image, a first epipolar line which passes through the two points chosen in the first image (e.g., $u_1$, $v_1$) in step 71 and the first reference object in the first image (e.g., $2a_1$), and to determine in the second image, a second epipolar line which passes through the two points determined in the second image (e.g., $u_2$, $v_2$) in step 72 and the first reference object in the second image (e.g., $2a_2$).

In step 75, the processing module 5 obtains a third image (not shown) and a fourth image (not shown) each of which is an image of the calibration board 1 and a second reference object (2b), and each of which is captured by a respective one of the first image capturing module 3 and the second image capturing module 4. The second reference object (2b) is non-coplanar with the calibration board 1.

In step 76, the processing module 5 chooses, in the third image, two points which are distinct from each other, which are contained in the calibration board in the third image and which are collinear with the second reference object in the third image.

In step 77, the processing module 5 determines, in the fourth image, two points which are distinct from each other, which are contained in the calibration board in the fourth image, and which correspond respectively to the two points chosen in the third image in step 76.

In step 78, the processing module 5 makes a second determination as to whether the two points determined in the fourth image in step 77 are collinear with the second reference object in the fourth image, and performs steps 76, 77 and 78 once again when a result of the second determination is negative. When the result of the second determination is affirmative, the processing module 5 performs step 79 to determine in the third image, a third epipolar line which passes through the two points chosen in the third image in step 76 and the second reference object in the third image, and to determine in the fourth image, a fourth epipolar line which passes through the two points determined in the fourth image in step 77 and the second reference object in the fourth image.

In step 80, the processing module 5 determines, based on the first epipolar line and the third epipolar line, a first epipole of the first image capturing module 3, and determines, based on the second epipolar line and the fourth epipolar line, a second epipole of the second image capturing module 4.

In step 81, the processing module 5 obtains a first set of corresponding points that includes one of the two points chosen in the first image (e.g., $u_1$) in step 71 and the corresponding one of the two points determined in the second image (e.g., $u_2$) in step 72, a second set of corresponding points that includes the other one of the two points chosen in the first image (e.g., $v_1$) in step 71 and the corresponding one of the two points determined in the second image (e.g., $v_2$) in step 72, a third set of corresponding points that includes one of the two points chosen in the third image in step 76 and the corresponding one of the two points determined in the fourth image in step 77, and a fourth set of corresponding points that includes the other one of the two points chosen in the third image in step 76 and the corresponding one of the two points determined in the fourth image in step 77.

In step 82, the processing module 5 establishes a fundamental matrix for the epipolar geometry associated with the first image capturing module 3 and the second image capturing module 4 according to the first epipole and the second epipole determined in step 80, and according to at least three of the first set of corresponding points, the second set of corresponding points, the third set of corresponding points and the fourth set of corresponding points obtained in step 81.

Figures 7, 8:
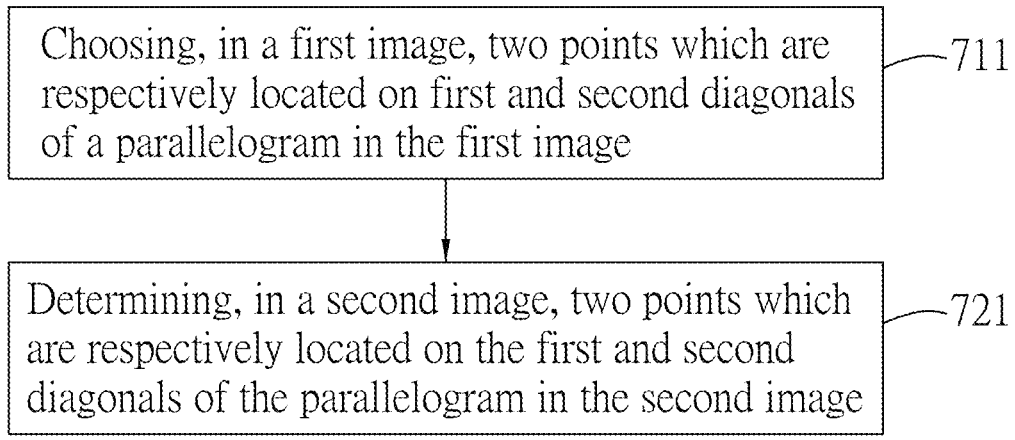
FIG. 7 illustrates an embodiment of choosing two points in the first image, and determining in the second image, two points corresponding respectively to the two points chosen in the first image.
FIG. 8 illustrates another embodiment of determining in the second image, two points corresponding respectively to the two points chosen in the first image.

Referring to FIGS. 2 and 7, which exemplify an embodiment of choosing two points ($u_1$, $v_1$) in the first image 201 (step 71), and determining, in the second image 202, two points ($u_2$, $v_2$) that correspond respectively to the two points ($u_1$, $v_1$) chosen in the first image 201 (step 72) according to this disclosure.

In this embodiment, the calibration board 1 is provided with a figure of a parallelogram (ABCD) that has a first diagonal and a second diagonal.

In step 711, the processing module 5 chooses, in the first image 201, the two points ($u_1$, $v_1$) which are respectively located on the first diagonal and the second diagonal of the parallelogram in the first image ($a_1 b_1 c_1 d_1$) and which are collinear with the first reference object in the first image ($2a_1$).

In step 721, the processing module 5 determines, in the second image 202, one of the two points ($u_2$) which is located on the first diagonal of the parallelogram in the second image ($a_2 b_2 c_2 d_2$) based on a geometric relationship between a position of the point which is located on the first diagonal of the parallelogram in the first image ($u_1$) and the first diagonal of the parallelogram in the first image, such as a ratio between two parts of the first diagonal of the parallelogram in the first image as divided by the point located on the first diagonal of the parallelogram in the first image ($u_1$), and determines, in the second image 202, the other one of the two points ($v_2$) which is located on the second diagonal of the parallelogram in the second image based on a geometric relationship between a position of the other point which is located on the second diagonal of the parallelogram in the first image ($v_1$) and the second diagonal of the parallelogram in the first image, such as a ratio between two parts of the second diagonal of the parallelogram in the first image as divided by said other point located on the second diagonal of the parallelogram in the first image ($v_1$).

Similarly, the processing module 5 chooses, in the third image (not shown) the two points which are respectively located on the first diagonal and the second diagonal of the parallelogram in the third image and which are collinear with the second reference object in the third image.

The processing module 5 determines, in the fourth image (not shown), one of the two points which is located on the first diagonal of the parallelogram in the fourth image based on a geometric relationship between a position of the point which is located on the first diagonal of the parallelogram in the third image and the first diagonal of the parallelogram in the third image, such as a ratio between two parts of the first diagonal of the parallelogram in the third image as divided by the point located on the first diagonal of the parallelogram in the third image, and determines, in the fourth image, the other one of the two points which is located on the second diagonal of the parallelogram in the fourth image based on a geometric relationship between a position of the other point which is located on the second diagonal of the parallelogram in the third image and the second diagonal of the parallelogram in the third image, such as a ratio between two parts of the second diagonal of the parallelogram in the third image as divided by said other point located on the second diagonal of the parallelogram in the third image.

Referring to FIGS. 4 and 8, which exemplify another embodiment of determining two points ($u_2'$, $v_2'$) in the second image 202' that correspond respectively to the two points ($u_1'$, $v_1'$) chosen in the first image 201' (step 72). In this embodiment, a display module 11' serves as the calibration board 1. In addition, the processing module 5 obtains a predetermined lookup table which is associated with positions of the first image capturing module 3 and the second image capturing module 4 relative to each other, and which stores correspondence relationships between points contained in the calibration board in the first image and points contained in the calibration board in the second image.

Since establishment of the predetermined lookup table has been explained earlier in this disclosure, details of the same are omitted herein for the sake of brevity.

In step 721', the processing module 5 determines in the second image 202', based on the predetermined lookup table and the two points chosen in the first image ($u_1'$, $v_1'$) to be used as input data to the predetermined lookup table, the two points contained in the calibration board in the second image ($u_2'$, $v_2'$).

Similarly, the processing module 5 determines in the fourth image (not shown), based on the predetermined lookup table and the two points chosen in the third image to be used as input data to the predetermined lookup table, the two points contained in the calibration board in the fourth image.

Figure 9:
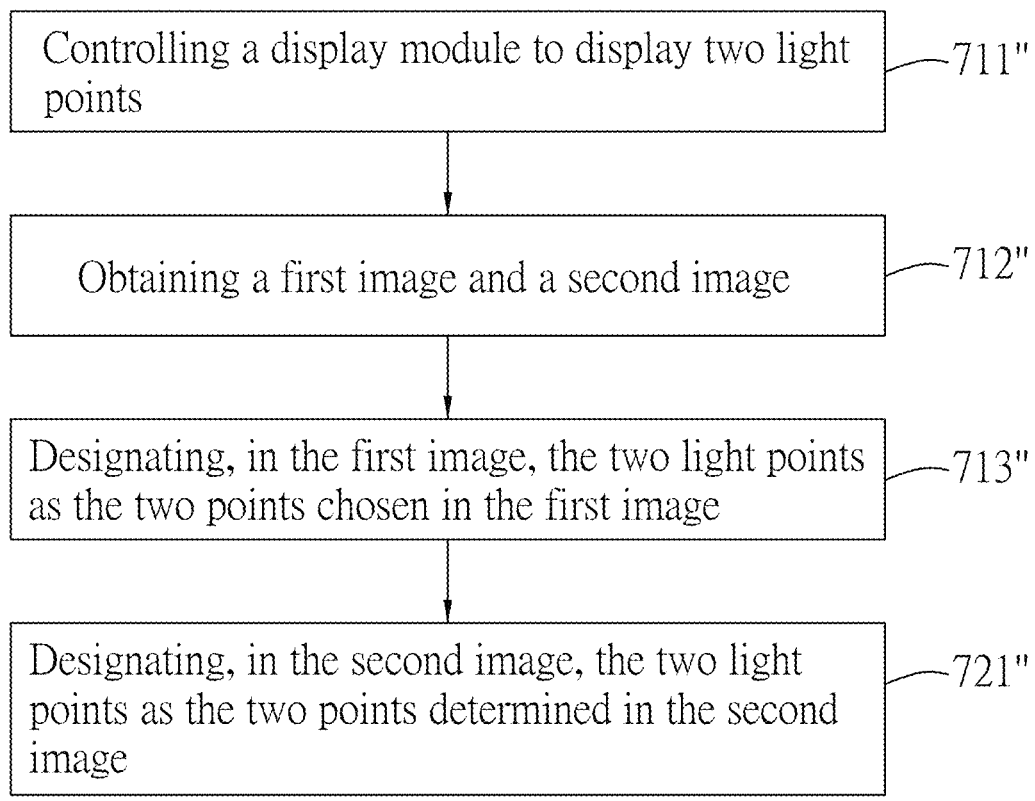
FIG. 9 illustrates still another embodiment of choosing two points in the first image, and determining, in the second image, two points corresponding respectively to the two points chosen in the first image.

Referring to FIGS. 5 and 9, which exemplify still another embodiment of choosing the two points ($u_1"$, $v_1"$) in the first image 201" (step 71) and determining two points ($u_2"$, $v_2"$) in the second image 202" that correspond respectively to the two points ($u_1"$, $v_1"$) chosen in the first image 201" (step 72). In this embodiment, the display module 11' serves as the calibration board 1.

In step 711", the processing module 5 controls the display module 11' to display two light points (U, V), in such a manner that the first image 201" captured by the first image capturing module 3 includes the two light points ($u_1"$, $v_1"$) which are collinear with the first reference object in the first image $2a_1"$.

In step 712", the processing module 5 obtains the first image 201" and the second image 202" each of which is the image of the display module 11' and the first reference object (2a) and each of which includes the two light points contained in the display module in a respective one of the first image ($u_1"$, $v_1"$) and the second image ($u_2"$, $v_2"$).

In step 713", the processing module 5 designates, in the first image 201", the two light points contained in the display module in the first image ($u_1"$, $v_1"$) as the two points chosen in the first image which are collinear with the first reference object in the first image ($2a_1"$).

In step 721", the processing module 5 designates, in the second image 202", the two light points contained in the display module in the second image ($u_2"$, $v_2"$) as the two points determined in the second image which correspond respectively to the two points chosen in the first image ($u_1"$, $v_1"$).

Similarly, the processing module 5 controls the display module 11' to display two other light points in such a manner that the third image captured by the first image capturing module 3 includes the two other light points which are collinear with the second reference object in the third image.

The processing module 5 obtains the third image (not shown) and the fourth image (not shown) each of which is an image of the display module and the second reference object, and each of which includes the two other light points contained in the display module in the corresponding image.

The processing module 5 designates, in the third image, the two other light points contained in the display module in the third image as the two points chosen in the third image which are collinear with the second reference object in the third image.

The processing module 5 designates, in the fourth image, the two other light points contained in the display module in the fourth image as the two points determined in the fourth image which correspond respectively to the two points chosen in the third image.

In summary, the method and system for estimating epipolar geometry are implemented by a processing module 5. The processing module 5 chooses, in each of first and third images captured by a first image capturing module 3, two points which are collinear with a corresponding one of a first reference object in the first image and a second reference object in the third image, and determines in each of second and fourth images captured by a second image capturing module 4, two points which correspond to the two points chosen in a respective one of the first and third images and which are collinear with a corresponding one of the first reference object in the second image and the second reference object in the fourth image. Thereafter, the processing module 5 is able to determine first and second epipoles based on the aforementioned points. Compared with a conventional approach of estimating epipolar geometry by at least seven reference objects that are coplanar with each other to establish the fundamental matrix and to obtain the first and second epipoles, the method and system of this disclosure reduce computational complexity in establishing the fundamental matrix, and require only the calibration board 1 and the first and second reference objects ($2a$, $2b$) so as to obtain the first and second epipoles and the fundamental matrix with higher accuracy.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for estimating epipolar geometry associated with a first image capturing module and a second image capturing module, the method to be performed by a processing module and comprising steps of:
   a) obtaining a first image and a second image each of which is an image of a calibration board and a first reference object that is non-coplanar with the calibration board, and each of which is captured by a respective one of the first image capturing module and the second image capturing module;
   b) choosing, in the first image, two points which are distinct from each other, which are contained in the calibration board in the first image and which are collinear with the first reference object in the first image;
   c) determining, in the second image, two points which are distinct from each other, which are contained in the calibration board in the second image, and which correspond respectively to the two points chosen in the first image in step b);
   d) making a first determination as to whether the two points determined in the second image in step c) are collinear with the first reference object in the second image, and performing steps b), c) and d) once again when a result of the first determination is negative;
   e) when the result of the first determination is affirmative, determining in the first image, a first epipolar line which passes through the two points chosen in the first image in step b) and through the first reference object in the first image, and determining in the second image, a second epipolar line which passes through the two points determined in the second image in step c) and through the first reference object in the second image;
   f) obtaining a third image and a fourth image each of which is an image of the calibration board and a second reference object that is non-coplanar with the calibration board, and each of which is captured by a respective one of the first image capturing module and the second image capturing module;
   g) choosing, in the third image, two points which are distinct from each other, which are contained in the calibration board in the third image and which are collinear with the second reference object in the third image;
   h) determining, in the fourth image, two points which are distinct from each other, which are contained in the calibration board in the fourth image, and which correspond respectively to the two points chosen in the third image in step g);
   i) making a second determination as to whether the two points determined in the fourth image in step h) are collinear with the second reference object in the fourth image, and performing steps g), h) and i) once again when a result of the second determination is negative;
   j) when the result of the second determination is affirmative, determining in the third image, a third epipolar line which passes through the two points chosen in the third image in step g) and through the second reference object in the third image, and determining in the fourth image a fourth epipolar line which passes through the two points determined in the fourth image in step h) and through the second reference object in the fourth image; and
   k) determining, based on the first epipolar line and the third epipolar line, a first epipole of the first image capturing module, and determining, based on the second epipolar line and the fourth epipolar line, a second epipole of the second image capturing module.

2. The method as claimed in claim 1, wherein:
in steps a) and f), the calibration board is provided with a figure of a parallelogram that has a first diagonal and a second diagonal;
step b) includes choosing, in the first image, the two points which are respectively located on the first diagonal and the second diagonal of the parallelogram in the first image;
step c) includes determining in the second image, based on a geometric relationship between a position of the point located on the first diagonal of the parallelogram in the first image and the first diagonal of the parallelogram in the first image, one of the two points which is located on the first diagonal of the parallelogram in the second image, and determining in the second image, based on a geometric relationship between a position of the point located on the second diagonal of the parallelogram in the first image and the second diagonal of the parallelogram in the first image, the other one of the two points which is located on the second diagonal of the parallelogram in the second image;
step g) includes choosing, in the third image, the two points which are respectively located on the first diagonal and the second diagonal of the parallelogram in the third image; and
step h) includes determining in the fourth image, based on a geometric relationship between a position of the point located on the first diagonal of the parallelogram in the third image and the first diagonal of the parallelogram in the third image, one of the two points which is located on the first diagonal of the parallelogram in the fourth image, and determining in the fourth image, based on a geometric relationship between a position of the point located on the second diagonal of the parallelogram in the third image and the second diagonal of the parallelogram in the third image, the other one of the two points which is located on the second diagonal of the parallelogram in the fourth image.

3. The method as claimed in claim 2, wherein:
step c) includes determining in the second image, said one of the two points based on a ratio between two parts of the first diagonal of the parallelogram in the first image as divided by the point located on the first diagonal of the parallelogram in the first image, and determining in the second image, the other one of the two points based on a ratio between two parts of the second diagonal of the parallelogram in the first image as divided by the point located on the second diagonal of the parallelogram in the first image; and
step h) includes determining in the fourth image, said one of the two points based on a ratio between two parts of the first diagonal of the parallelogram in the third image as divided by the point located on the first diagonal of the parallelogram in the third image, and determining in the fourth image, the other one of the two points based on a ratio between two parts of the second diagonal of the parallelogram in the third image as divided by the point located on the second diagonal of the parallelogram in the third image.

4. The method as claimed in claim 1, prior to steps c) and h), further comprising:
l) obtaining a predetermined lookup table which is associated with positions of the first image capturing module and the second image capturing module relative to each other and which stores correspondence relationships between points contained in the calibration board in the first image and points contained in the calibration board in the second image, wherein,
step c) includes determining in the second image, based on the predetermined lookup table and the two points chosen in the first image in step b) to be used as input data to the predetermined lookup table, the two points contained in the calibration board in the second image, and
step h) includes determining in the fourth image, based on the predetermined lookup table and the two points chosen in the third image in step g) to be used as input data to the predetermined lookup table, the two points contained in the calibration board in the fourth image.

5. The method as claimed in claim 4, wherein in step l), the predetermined lookup table is established in advance by:
displaying one by one, using a display module that serves as the calibration board, a plurality of light points, each of which is at a different position on the display module;
for each of the light points displayed on the display module, capturing, using the first image capturing module and the second image capturing module, images of the display module, the light point included in the image captured by the first image capturing module corresponding to the light point included in the image captured by the second image capturing module; and
establishing the lookup table according to each correspondence relationship between the light point included in the image captured by the first image capturing module and the light point included in the image captured by the second image capturing module.

6. The method as claimed in claim 1, further comprising step m) prior to step a), and step n) prior to step f):
m) controlling a display module, that serves as the calibration board, to display two light points, such that the first image captured by the first image capturing module includes the two light points which are collinear with the first reference object in the first image; and
n) controlling the display module to display two other light points, such that the third image captured by the first image capturing module includes the two other light points which are collinear with the second reference object in the third image; wherein
step a) includes obtaining the first image and the second image each of which is the image of the display module and the first reference object, and each of which includes the two light points contained in the display module in the corresponding one of the first image and the second image;
step b) includes designating, in the first image, the two light points contained in the display module in the first image as the two points chosen in the first image which are collinear with the first reference object in the first image;
step c) includes designating, in the second image, the two light points contained in the display module in the second image as the two points determined in the second image which correspond respectively to the two points chosen in the first image in step b);
step f) includes obtaining the third image and the fourth image each of which is the image of the display module and the second reference object, and each of which includes the two other light points contained in the display module in the corresponding one of the third image and the fourth image;
step g) includes designating, in the third image, the two other light points contained in the display module in the third image as the two points chosen in the third image which are collinear with the second reference object in the third image; and
step h) includes designating, in the fourth image, the two other light points contained in the display module in the fourth image as the two points determined in the fourth image which correspond respectively to the two points chosen in the third image in step g).

7. The method as claimed in claim 1, subsequent to step k), further comprising steps of:
o) obtaining a first set of corresponding points that includes one of the two points chosen in the first image in step b) and the corresponding one of the two points determined in the second image in step c), a second set of corresponding points that includes the other one of the two points chosen in the first image in step b) and the corresponding one of the two points determined in the second image in step c), a third set of corresponding points that includes one of the two points chosen in the third image in step g) and the corresponding one of the two points determined in the fourth image in step h), and a fourth set of corresponding points that includes the other one of the two points chosen in the third image in step g) and the corresponding one of the two points determined in the fourth image in step h); and
p) establishing a fundamental matrix for the epipolar geometry associated with the first image capturing module and the second image capturing module according to the first epipole and the second epipole determined in step k), and according to at least three of the first set of corresponding points, the second set of corresponding points, the third set of corresponding points and the fourth set of corresponding points obtained in step o).

8. A system for estimating epipolar geometry comprising:
a calibration board;
a first reference object that is non-coplanar with said calibration board;
a second reference object that is different from said first reference object and non-coplanar with said calibration board;
a first image capturing module configured to capture a first image which is an image of said calibration board and said first reference object;
a second image capturing module configured to capture a second image which is another image of said calibration board and said first reference object; and
a processing module coupled electrically to said first image capturing module and said second image capturing module, and configured to:
obtain the first image and the second image,
choose, in the first image, two points which are distinct from each other, which are contained in the calibration board in the first image and which are collinear with the first reference object in the first image, determine, in the second image, two points which are distinct from each other, which are contained in the calibration board in the second image, and which correspond respectively to the two points chosen in the first image, make a first determination as to whether the two points determined in the second image are collinear with the first reference object in the second image, and, when a result of the first determination is negative, perform once again steps of choosing two points in the first image, determining two points in the second image, and making the first determination, when the result of the first determination is affirmative, determine in the first image, a first epipolar line which passes through the two points chosen in the first image and the first reference object in the first image, and determine in the second image, a second epipolar line which passes through the two points determined in the second image and the first reference object in the second image, obtain a third image and a fourth image each of which is an image of said calibration board and said second reference object, and each of which is captured by a respective one of said first image capturing module and said second image capturing module, choose, in the third image, two points which are distinct from each other, which are contained in the calibration board in the third image, and which are collinear with the second reference object in the third image, determine, in the fourth image, two points which are distinct from each other, which are contained in the calibration board in the fourth image, and which correspond respectively to the two points chosen in the third image, make a second determination as to whether the two points determined in the fourth image are collinear with the second reference object in the fourth image, and, when a result of the second determination is negative, perform once again steps of choosing two points in the third image, determining two points in the fourth image, and making the second determination, when the result of the second determination is affirmative, determine in the third image, a third epipolar line which passes through the two points chosen in the third image and the second reference object in the third image, and determine in the fourth image, a fourth epipolar line which passes through the two points determined in the fourth image and the second reference object in the fourth image, and determine, based on the first epipolar line and the third epipolar line, a first epipole of said first image capturing module, and determine, based on the second epipolar line and the fourth epipolar line, a second epipole of said second image capturing module.

9. The system as claimed in claim 8, wherein:

said calibration board is provided with a figure of a parallelogram that has a first diagonal and a second diagonal; and said processing module is further configured to:

choose, in the first image, the two points which are respectively located on the first diagonal and the second diagonal of the parallelogram in the first image, determine in the second image, based on a geometric relationship between a position of the point located on the first diagonal of the parallelogram in the first image and the first diagonal of the parallelogram in the first image, one of the two points which is located on the first diagonal of the parallelogram in the second image, and determine in the second image, based on a geometric relationship between a position of the point located on the second diagonal of the parallelogram in the first image and the second diagonal of the parallelogram in the first image, the other one of the two points which is located on the second diagonal of the parallelogram in the second image, choose, in the third image, the two points which are respectively located on the first diagonal and the second diagonal of the parallelogram in the third image; and determine in the fourth image, based on a geometric relationship between a position of the point located on the first diagonal of the parallelogram in the third image and the first diagonal of the parallelogram in the third image, one of the two points which is located on the first diagonal of the parallelogram in the fourth image, and determine in the fourth image, based on a geometric relationship between a position of the point located on the second diagonal of the parallelogram in the third image and the second diagonal of the parallelogram in the third image, the other one of the two points which is located on the second diagonal of the parallelogram in the fourth image.

10. The system as claimed in claim 9, wherein said processing module is further configured to:

determine in the second image said one of the two points based on a ratio between two parts of the first diagonal of the parallelogram in the first image as divided by the point located on the first diagonal of the parallelogram in the first image, and determine in the second image the other one of the two points based on a ratio between two parts of the second diagonal of the parallelogram in the first image as divided by the point located on the second diagonal of the parallelogram in the first image; and determine in the fourth image said one of the two points based on a ratio between two parts of the first diagonal of the parallelogram in the third image as divided by the point located on the first diagonal of the parallelogram in the third image, and determine in the fourth image the other one of the two points based on a ratio between two parts of the second diagonal of the parallelogram in the third image as divided by the point located on the second diagonal of the parallelogram in the third image.

11. The system as claimed in claim 8, wherein said processing module is further configured to:

obtain a predetermined lookup table which is associated with positions of said first image capturing module and said second image capturing module relative to each other and which stores correspondence relationships between points contained in the calibration board in the first image and points contained in the calibration board in the second image;

determine in the second image, based on the predetermined lookup table and the two points chosen in the first image to be used as input data to the predetermined lookup table, the two points contained in the calibration board in the second image, and determine in the fourth image, based on the predetermined lookup table and the two points chosen in the third image to be used as input data to the predetermined lookup table, the two points contained in the calibration board in the fourth image.

12. The system as claimed in claim 11, further comprising a display module that serves as said calibration board, wherein the predetermined lookup table is established in advance by:
    displaying one by one, using said display module, a plurality of light points each being at a different position on the display module;
    for each of the light points displayed on said display module, capturing, using said first image capturing module and said second image capturing module, images of said display module, the light point included in the image captured by said first image capturing module corresponding to the light point included in the image captured by said second image capturing module; and
    establishing the lookup table according to each correspondence relationship between the light point included in the image captured by said first image capturing module and the light point included in the image captured by said second image capturing module.

13. The system as claimed in claim 8, further comprising a display module that serves as said calibration board, wherein said processing module is further configured to:
    control said display module to display two light points, such that the first image captured by said first image capturing module includes the two light points which are collinear with the first reference object in the first image;
    control said display module to display two other light points, such that the third image captured by said first image capturing module includes the two other light points which are collinear with the second reference object in the third image; obtain the first image and the second image each of which is an image of display module and said first reference object, and each of which includes the two light points contained in the display module in the corresponding one of the first image and the second image;
    designate, in the first image, the two light points contained in the display module in the first image as the two points chosen in the first image which are collinear with the first reference object in the first image;
    designate, in the second image, the two light points contained in the display module in the second image as the two points determined in the second image which correspond respectively to the two points chosen in the first image;
    obtain the third image and the fourth image each of which is an image of said display module and said second reference object, and each of which includes the two other light points contained in the display module in the corresponding one of the third image and the fourth image;
    designate, in the third image, the two other light points contained in the display module in the third image as the two points chosen in the third image which are collinear with the second reference object in the third image,
    designate, in the fourth image, the two other light points contained in the display module in the fourth image as the two points determined in the fourth image which correspond respectively to the two points chosen in the third image.

14. The system as claimed in claim 8, wherein said processing module is further configured to:
    obtain a first set of corresponding points that includes one of the two points chosen in the first image and the corresponding one of the two points determined in the second image, a second set of corresponding points that includes the other one of the two points chosen in the first image and the corresponding one of the two points determined in the second image, a third set of corresponding points that includes one of the two points chosen in the third image and the corresponding one of the two points determined in the fourth image, and a fourth set of corresponding points that includes the other one of the two points chosen in the third image and the corresponding one of the two points determined in the fourth image; and
    establish a fundamental matrix for the epipolar geometry associated with said first image capturing module and said second image capturing module according to the first epipole and the second epipole thus determined, and according to at least three of the first set of corresponding points, the second set of corresponding points, the third set of corresponding points and the fourth set of corresponding points.

* * * * *